United States Patent [19]

Takezoe

[11] 4,015,241
[45] Mar. 29, 1977

[54] INFORMATION PROCESSING SYSTEM

[75] Inventor: Fumihiko Takezoe, Kawasaki, Japan

[73] Assignee: Fuji Electric Company Ltd., Kawasaki, Japan

[22] Filed: Feb. 12, 1976

[21] Appl. No.: 657,663

[30] Foreign Application Priority Data

Feb. 12, 1975 Japan .............................. 50-17629

[52] U.S. Cl. ..................... 340/147 SC; 340/147 R; 179/15 AL; 179/15 BF; 340/147 LP
[51] Int. Cl.² ........................................ H04Q 9/00
[58] Field of Search ......... 340/147 SC; 179/15 AL, 179/15 BF, 147 R, 147 LP

[56] References Cited

UNITED STATES PATENTS 3,876,983  4/1975  Zafiropulo ................. 340/147 SC Primary Examiner—Harold I. Pitts
Attorney, Agent, or Firm—Sughrue, Rothwell, Mion, Zinn & Macpeak

[57] ABSTRACT

In an information system of the type having widely dispersed terminals tied together in series by an information transmission line. Bypassing means is provided for bypassing a non-operating station so as not to disrupt said information transmission line, apparatus is provided for preventing any station from dispatching information destined for a non-operating station.

10 Claims, 5 Drawing Figures

INFORMATION PROCESSING SYSTEM

BACKGROUND OF THE INVENTION

This invention relates to an information processing system for transmitting information mutually between optional information processing stations by connecting in cascade via information transmission lines plural information processing stations dispersed over a wide area such as for example in a system for controlling objects that are dispersed over a wide area, such devices usually arranged in groups. Each group comprises an information processing station for mutually transmitting information between each device within the group, and the processing station of the group is connected by means of information transmission lines to the processing stations of other groups. In such a system, since the number and total cost of transmission lines would be great if each station is individually directly connected to every other station, it is conventional to connect plural information processing stations in cascade, either open loop or closed loop, as shown in FIGS. 1(a) and 1(b). The stations are shown as $S_1$–$S_n$, the transmission lines are shown as $L_1$–$L_n$.

A conventional arrangement for each processing station $S_1$–$S_n$ is shown in general block form in FIG. 2. A common information bus B is controlled by a controller Sc, and one or more information processing devices $D_1$–$D_n$ and one or two communication terminals Ta and Tb havng bilateral communication facility are connected in parallel to said bus. To each of the communication terminals Ta and Tb, external transmission lines La and Lb are connected via change-over switches Ra and Rb, respectively, for switching the lines to the by-pass transmission line $L_p$ when the station is out of order or is not operating. The other ends of lines La and Lb are connected to the communication terminals of other stations not shown in the figure.

In such stations, all information transmission, between the information processing devices and the communication terminals is carried out via bus B under control of station controller Sc. When received information contains the address of the receiving station and an information processing device within the station, the information is transmitted via bus B from the terminal where received to the designated device or devices, under control of the controller Sc. The controller reads the address of the received information and commands the intake of the information on the bus B to the information processing device to which it is addressed, or commands the intake of the information on the bus B to either terminal Ta or Tb for retransmission if the address is that of an information processing device in other than the station to which the controller belongs. When the communication terminal thus receives the information from the bus B, it feeds the information to an external transmitting line automatically and thereby transmits the information to another station. When the communication terminal receives information transmitted from an external transmitting line, it feeds the information to the bus B by permission of the controller Sc.

Therefore, when information is received from another station via line La, the communication terminal Ta feeds the information onto the bus B by permission of the controller Sc in the conventional manner. The controller Sc then reads the address of the information and if the address is that of the processing device $D_1$ located at the station, for instance, it commands the processing device $D_1$ to accept the information. If the address is that of a station other than the one to which the controller Sc belongs, it commands the other communication terminal Tb to accept the information and to transmit same via external transmitting line Lb to the next station along line Lb.

If the station stops operating for any reason, such as an electric failure, the change-over switches Ra and Rb operate and switch the contacts from the communication terminals Ta and Tb to the by-pass transmitting line $L_p$ to connect the external transmission line La and Lb with the by-pass transmission line $L_p$ and to disconnect the station S from the transmitting system.

If the information transmission process for systems shown in FIGS. 1(a) and 1(b), when information is dispatched from one station to another station, each station following the one station reads the address of the information and if the address is that of itself, it accepts the information in itself, and if the address is that of another station, it passes the information to the following stations. The information therefore cycles in the series or closed loop transmission line until the information reaches the addressed station. In systems of the type wherein plural stations are connected in cascade with open connection between both end stations $S_1$ and $S_n$, the end stations $S_1$ and $S_n$ differ slightly from the other stations. That is, each of the stations $S_1$ and $S_n$ has a communication terminal which is operated to receive the information transmitted from stations $S_2$ and $S_{n-1}$, respectively, to read the address of the information, and to return the information to stations $S_2$ and $S_{n-1}$, respectively, unless the address is that of itself. The function of reversing the direction of transmission of the information may be provided to each intermediate station in the processor of series open loop constitution shown in FIG. 1(a) or each station in the processing system of closed loop constitution shown in FIG. 1(b).

Since each station not in working condition passes the information through the by-pass transmission line, the performance of transmission between operating stations is not impaired because of a shut down of one or more stations in the loop. However, if the transmission of information is performed without knowing which stations are shut down it is possible that information addressed to a non-working station will be dispatched with the result that the information will continue to circulate through the loop. If such ineffective information is accumulated, the transmission efficiency of necessary information becomes worse, and the transmission of information between stations becomes delayed.

The object of this invention is to prevent the occurrence of ineffective information from being dispatched in a system of the type described above. One system and method for accumulating and disseminating common data showing the working condition of all stations is described and claimed in commonly assigned co-pending application (corresponds to Japanese Patent Application 50-17628) entitled "A Method and Apparatus for Transmitting Common Information in the Information Processing System".

SUMMARY OF THE INVENTION

To achieve the above object, each station is provided with a means for displaying the working condition of all information processing stations, a means for checking the working condition of an addressee by means of said display means when said information processing station transmits the information to another station, and a means for performing the transmission of said information to the outside when said checking means detects that the station to which said information is addressed is in working condition, and for inhibiting the transmission of said information to the outside when said checking means detects that the station whereto said information is addressed is not in working condition.

DETAILED DESCRIPTION OF THE INVENTION

Figure 1A:
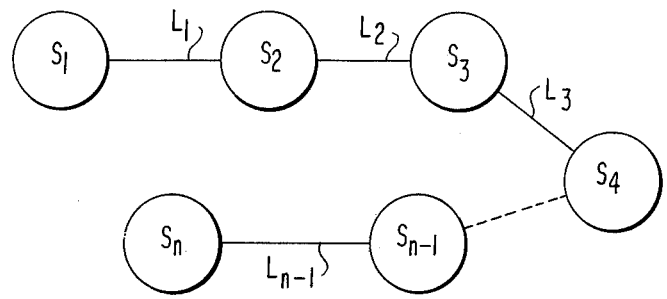
FIGS. 1(a) and 1(b) are the block diagrams showing the basic constitution of a conventional information processing system to which this invention is applied.
Figure 1B:
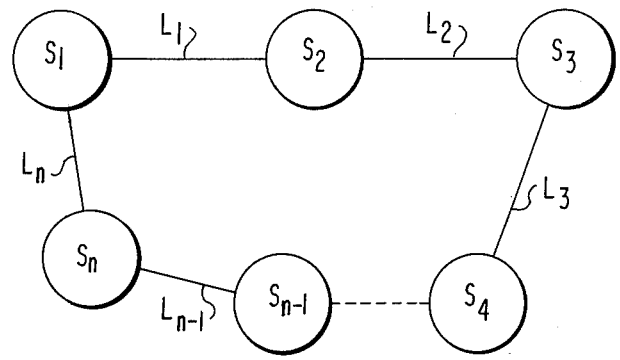
Figure 2:
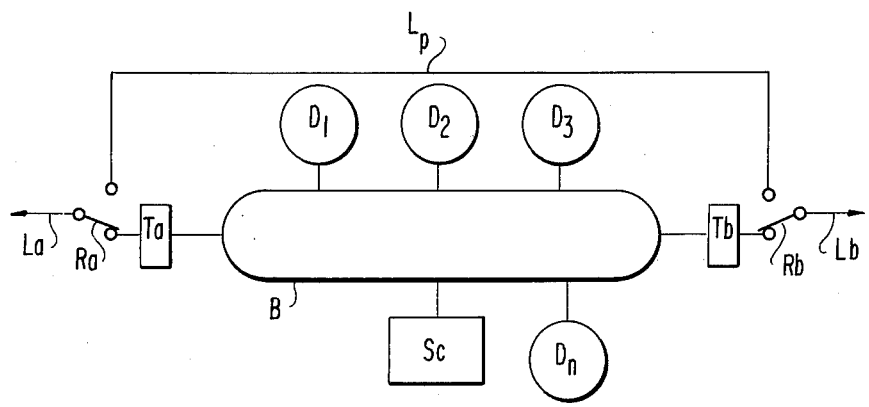
FIG. 2 is a block diagram showing the basic constitution of a conventional information processing station to which this invention is applied.
Figure 3:
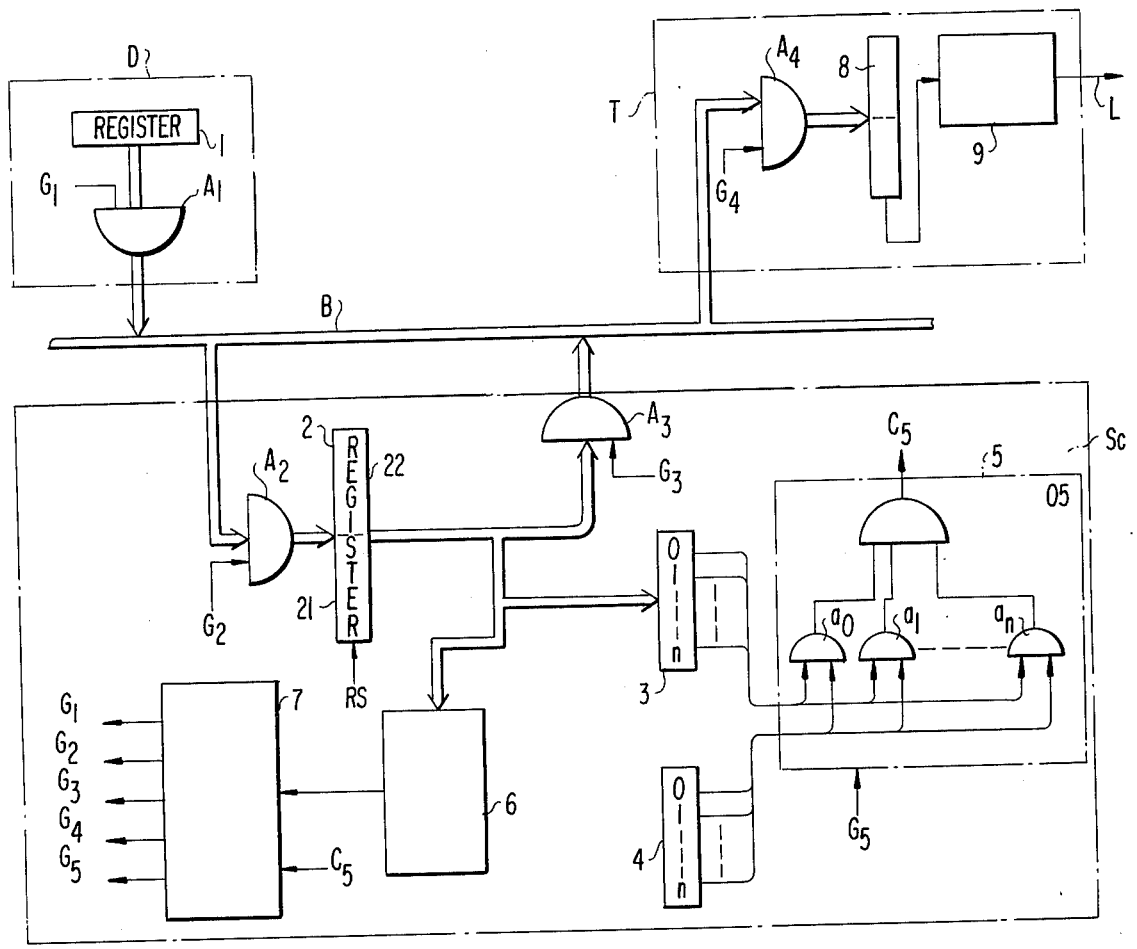
FIG. 3 is a block diagram of an information processing station showing an example of this invention.

FIG. 3 shows an example of an information processing station in accordance with this invention. Inasmuch as stations of the general type described herein are known in the art, many of the standard features of such stations will not be described. In the drawing, B is the information bus to which the information processing device D, the station controller Sc, and the communication terminal T are connected. The information processing device D has an information register 1 for temporarily storing the information to be transmitted externally, and the gate $A_1$ for gating the information from register 1 onto the bus B. The station controller Sc includes a gate $A_2$ for inputting information from the bus B, and an information register 2 for temporarily storing such information. An address reading circuit 6 and a decoder 3, for decoding the address, are connected to the area 22 which stores the operation part, containing the address of the destination of the information in the register 2. The controller Sc also includes a display register 4 for displaying the working conditions of all stations in the system and a check circuit 5 for checking the working condition of the station to which the information is addressed. The checking function is carried out by comparing the output of decoder 3 with the corresponding bit in display register 4. The output, $C_5$, of the checking circuit 5 is applied to and controls the control circuit 7 for controlling the writing gate $A_3$ of the register 2 and the like. The control circuit 7 operates according to the output of the address reading circuit 6, in a well known manner to generate the gating signals for controlling the operation of each gate in the station. The communication equipment T includes a gate $A_4$ for gating the information on the bus B into the information register 8, and a transmitter 9 for transmitting the information put in the register 8 serially onto the external transmission line L.

The display register 4 in said controller Sc has at least the same number of bits as there are stations in the system, and each bit of the display register 4 is individually assigned to each station. For instance, the 0 bit of the display register 4 is assigned to the station of which the station address is 0, the 1 bit is assigned to the station of which the station address is 1, and the $n$ bit is assigned to the station of which the station address is $n$.

To each bit of the display register 4, the "1" signal is set when the corresponding station is working and the "0" signal when the station is not working. Although the method of collecting the information in register 4 does not form any part of the inventive features herein, one suitable method, and apparatus for carrying out said method, is the subject of the copending application referred to previously herein.

The decoder 3 has the same number of bit output lines as the display register 4. The coded address information in register 2 is decoded by decoder 3 which emits a 1 signal on the output line corresponding to the addressee station, and emits a 0 signal on all other output lines. The checking circuit 5 compares the output of said decoder 3 and the display of the display register 4 for each bit by means of the AND circuits $a_o$–$a_n$, and provides a check signal $C_5$ of the value 1 to the control circuit 7 only where the addressee station is indicated by the display register 4 as being in working condition. Otherwise, the check signal $C_5$ will have the value 0, i.e., $\overline{C_5}$.

The station operates as follows.

When an information processing device D in the station demands the use of the bus B for the transmission of information, the station controller Sc gives permission to use the bus B unless there are other demands for the use of the bus B. At the time $T_1$ in FIG. 4, gate signals $G_1$ and $G_2$ are generated by the control circuit 7 and are applied to the writing gate $A_1$ of the processing device D and the gate $A_2$ of the controller Sc, respectively. Then, the gates $A_1$ and $A_2$ are opened and the information, with the address showing the destination of the information, is gated into the information register 2. The address of the information put in the register 2 is led to the reading circuit 6 where it is read in a conventional manner.

Figure 4:
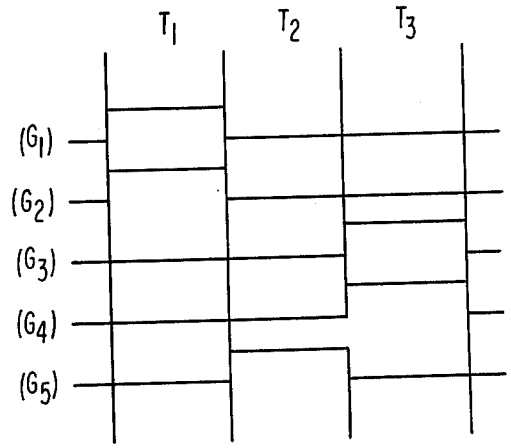
FIG. 4 is a time chart of gating signals generated in the station of FIG. 3.

When said information is to be transmitted to the other external stations, the control circuit 7 generates the check instruction signal $G_5$ which gates on the checking circuit 5 by the instruction from the reading circuit 6 at the timing $T_2$ as shown in FIG. 4. Then, the checking circuit 5 compares each bit signal of the decoder 3 with the corresponding bit signal of the display register 4.

As an example, when the information is addressed to a station having the address i, the decoder 3 emits a 1 bit signal on line $i$ of the output lines and 0 bit signals on all other lines. Since all AND gates except gate $a_i$ receives a 0 input, it is only possible for $a_i$ to be fully opened. If register 4 contains a 1 bit signal in the $i$ position, indicating that station i is working, then gate $a_i$ becomes fully energized causing a 1 bit signal output to pass through OR gate $O_5$. The latter signal is connected to the control circuit 7 as the check signal $C_5$. If the station i is not working, gate $a_i$ will not be fully energized and the $C_5$ signal will be 0.

When the check signal $C_5$ is a 1 signal, during the time $T_2$, the control circuit 7 emits the gate signals $G_3$ and $G_4$ for gating open gate $A_3$ of the controller Sc and gate $A_4$ of the communication equipment T at the following time $T_3$ as shown in FIG. 4. Then, the information in register 2 passes through gate $A_3$, bus B, and gate $A_4$, to the register 8. The communication automatically begins after timing $T_3$ when it thus puts the information to be transmitted in the register 8, and dispatches the information put in the register 8 to the external information transmission line L by means of the emitter 9 and performs the transmission to the other external stations.

When the check signal $C_5$ is 0 at the time $T_2$, the control circuit 7 stops the emission of gate signals $G_3$ and $G_4$ at the time $T_3$. Therefore, at the time $T_3$ wherein the information transmission from the controller Sc to the communication device T is normally performed, since the emitting gate $A_3$ of the controller Sc and the input gate $A_4$ of the communication equipment T are kept closed, the information transmission from the controller Sc to the communication equipment T is not performed. Therefore, the communication equipment T also does not perform communication, and the dispatch of said information to the external transmission line L is inhibited.

The display means of this invention merely has the function to hold the signals, and does not necessarily signify a visible display means. Typically a non-displaying electronic register would be used.

As the above description clarifies, according to this invention, since the display register for displaying the working conditions of all stations is provided in each station of the information processing system, and when each station transmits the information to the other stations, if said display register detects that the station whereto the information is transmitted is working, the transmission of the information is performed and if the station is not working, the transmission is inhibited. As a result the occurrence of the ineffective information destined for non-working stations is prevented in the processing system. Since the ineffective information is not accumulated in the processing system of this invention, the efficiency of transmission of actually required information is improved, and the transmission is not delayed resulting in the smooth transmission of information between stations.

What is claimed is:

1. In an information processing system of the type having a plurality of widely dispersed stations interconnected in cascade by means of a transmission link for transmitting information between stations, said system further being of the type wherein non-operating stations are by-passed by means of a bypass connection, and wherein each of the stations of said system is of the type which has a controller for controlling the routing of all information in the station and which is capable of transmitting and receiving information words having at least an address part, the improvement comprising means at at least one station for preventing said station from transmitting information words destined for a non-operating station.

2. The system of claim 1 wherein said improvement further comprises means at every station for preventing the transmission of information words destined for a non-operating station.

3. The system of claim 1 wherein said means for preventing comprises, a. a register means for storing indicia of the working condition of each station in said system, b. address reading circuit means for reading the address of information ready to be sent to a destination station, and c. checking means responsive to the indicia in said register means and the address detected by said reading circuit means for stopping the transmission of said ready information when said destination station is indicated by said indicia as being non-operating.

4. The system of claim 3 wherein said indicia is a single bit for each station, a 0 bit indicating one of said conditions and a 1 bit indicating the opposite condition and wherein each stage of said register represents a different one of said stations.

5. The system of claim 4 wherein said address reading circuit means comprises a decoder having a plurality of output terminals, at least one for each of the other station in the system, and which operates to place a unique signal on the one output terminal corresponding to the address read by the decoder.

6. The system of claim 4 wherein said checking means comprises, a bank of AND gates, at least equal in number to the other stations in said system, each AND gate having applied thereto one signal from one of said register terminals and one signal from a corresponding stage of said register, and means for applying the outputs of said AND gates to said controller.

7. In an information processing system of the type having a plurality of widely dispersed stations interconnected in cascade by means of a transmission link for transmitting information between stations, said system further being of the type wherein non-operating stations are by-passed by means of a bypass connection, and wherein each of the stations of said system is of the type which has a controller for controlling the routing of all information in the station and which is capable of transmitting and receiving information words having at least an address part, the method characterized by storing an indicia at at least one station of the working condition of all other stations, and preventing said one station from transmitting information words destined for a non-operating station.

8. The method of claim 7 further characterized by said last two mentioned steps being performed at every station.

9. The method of claim 7 wherein the step of preventing comprises, a. reading the address of information ready to be sent to a destination station, and b. stopping the transmission of said ready information when said destination station is indicated by said indicia as being non-operating.

10. The method of claim 9 wherein said indicia is a single bit for each station, a 0 bit indicating one of said conditions and a 1 bit indicating the opposite condition.

* * * * *